(12) United States Patent
Sekimoto

(10) Patent No.: US 10,261,716 B2
(45) Date of Patent: Apr. 16, 2019

(54) PROGRAMMABLE DISPLAY, UPDATE PROCESSING APPARATUS, UPDATING METHOD, INFORMATION PROCESSING METHOD, AND PROGRAM STORED ON COMPUTER-READABLE RECORDING MEDIUM

(71) Applicant: OMRON Corporation, Kyoto-shi, Kyoto (JP)

(72) Inventor: Hidehiko Sekimoto, Osaka (JP)

(73) Assignee: OMRON Corporation, Kyoto-shi (JP)

( * ) Notice: Subject to any disclaimer, the term of this patent is extended or adjusted under 35 U.S.C. 154(b) by 16 days.

(21) Appl. No.: 15/652,322

(22) Filed: Jul. 18, 2017

(65) Prior Publication Data

US 2018/0046395 A1   Feb. 15, 2018

(30) Foreign Application Priority Data

Aug. 12, 2016  (JP) ................ 2016-158874

(51) Int. Cl.

| G06F 12/02 | (2006.01) |
| G06F 3/06 | (2006.01) |
| G05B 19/042 | (2006.01) |
| G06F 8/658 | (2018.01) |
| G06F 8/65 | (2018.01) |

(52) U.S. Cl.
CPC ....... *G06F 3/0643* (2013.01); *G05B 19/0423* (2013.01); *G06F 3/0604* (2013.01); *G06F 3/0679* (2013.01); *G06F 8/658* (2018.02); *G06F 8/65* (2013.01)

(58) Field of Classification Search
CPC combination set(s) only.
See application file for complete search history.

(56) References Cited

U.S. PATENT DOCUMENTS

| 2009/0187603 A1 | 7/2009 | Sakamoto |
| 2011/0093839 A1 | 4/2011 | Murase |
| 2012/0054730 A1 | 3/2012 | Michishita |
| 2015/0277897 A1* | 10/2015 | Deng ................ G06F 8/654 717/169 |
| 2016/0342481 A1* | 11/2016 | Nanivadekar ..... G06F 17/30073 |

FOREIGN PATENT DOCUMENTS

| EP | 2312435 A1 | 4/2011 |
| JP | 2007-249347 A | 9/2007 |

\* cited by examiner

*Primary Examiner* — Yong J Choe
(74) *Attorney, Agent, or Firm* — Metrolexis Law Group, PLLC

(57) ABSTRACT

A programmable display includes a memory unit for storing an existing file group, a reading unit for obtaining an update file group, a difference extraction unit for extracting, from the update file group, a file different from files in the existing file group as a difference file, and a writing unit for updating the existing file group by writing the difference file to the memory unit.

9 Claims, 17 Drawing Sheets

FIG. 3

```
<File Name="file1.dll" ByteSize="1036" Hash="3BD4B5AAD9E16BA00579B6AF92934A9CD90E185B" ... />
<File Name="File2.png" ByteSize="2096" Hash="04B2254B326797A2259313ED7B17EBE444B29BCD" ... />
<File Name="File3.dll" ByteSize="103673" Hash="A2E8798578D77D3BF089D4FDF9A0C3DCC13F43DF" ... />
..
```

45b

| | File size | Average writing speed (sec/file) | | Number of files by size | Estimated writing time for each class (sec) |
|---|---|---|---|---|---|
| Class 1 | Less than 4 KB | 0.086 | × | 300 = | 25.86 |
| Class 2 | 4 to 8 KB | 0.087 | × | 20 = | 1.74 |
| Class 3 | 4 to 16 KB | 0.090 | × | 1 = | 0.09 |
| Class 4 | 16 to 32 KB | 0.092 | × | 5 = | 0.46 |
| Class 5 | 32 to 64 KB | 0.094 | × | 30 = | 2.83 |
| Class 6 | 64 to 128 KB | 0.104 | × | 80 = | 8.33 |
| Class 7 | 128 to 256 KB | 0.124 | × | 10 = | 1.24 |
| Class 8 | 256 to 512 KB | 0.150 | × | 0 = | 0.00 |
| Class 9 | 512 KB or more | 0.173 | × | 3 = | 0.52 |

| Update time (total) (sec) | 41.06 |
|---|---|

PROGRAMMABLE DISPLAY, UPDATE PROCESSING APPARATUS, UPDATING METHOD, INFORMATION PROCESSING METHOD, AND PROGRAM STORED ON COMPUTER-READABLE RECORDING MEDIUM

CROSS REFERENCE TO RELATED APPLICATIONS

This application claims priority from prior Japanese Patent Application No. 2016-158874 filed with the Japan Patent Office on Aug. 12, 2016, the entire contents of which are incorporated herein by reference.

FIELD

The disclosure relates to a programmable display and an update processing apparatus that are connected to a controller for controlling the operation of machines or equipment, an updating method, an information processing method, and a program.

BACKGROUND

A control system known in the art includes a controller such as a programmable logic controller (PLC), or also called a programmable controller, and a programmable display connected to the PLC.

The programmable display performs various processes including display processes for displaying information received from the PLC and input processes for receiving input instructions for the PLC and transferring the instructions to the PLC. The programmable display stores programs including firmware for performing these various processes and file groups including screen data. The file group stored in the programmable display is referred to as an existing file group.

When the control target is changed or a program is to be updated, the existing file group stored in the programmable display is to be updated.

When the user has software for updating data, the user may update the existing file group stored in the programmable display using a personal computer in which the software has been installed.

However, users may not have such software for updating data. Japanese Unexamined Patent Application Publication No. 2007-249347 (Patent Literature 1) describes a technique for allowing the programmable display to import maintenance data from a memory card and update the existing file group based on the maintenance data.

CITATION LIST

Patent Literature

Patent Literature 1: Japanese Unexamined Patent Application Publication No. 2007-249347

SUMMARY

Technical Problem

When the existing file group stored in the programmable display is to be updated using a memory card, the entire existing file group is to be overwritten with a new file group (hereafter referred to as an update file group). A storage storing the existing file group is typically a nonvolatile memory.

FIG. 17 is a diagram describing the transfer of a file when the existing file group stored in the programmable display is updated using a memory card. As shown in FIG. 17, files are transferred from the memory card to the programmable display at a relatively high speed of, for example, 64 Mbps. In contrast, files are written to the nonvolatile memory of the programmable display at a low speed of, for example, 0.36 Mbps. In particular, writing a large number of small files takes long time. The writing time is longer when a flash memory is used.

In this manner, the writing speed to a nonvolatile memory is typically low. A first issue is that writing the entire update file group to the programmable display takes long time.

Additionally, when either a memory card or a personal computer with software installed for updating data is used, the user may not estimate the time taken for updating data. A second issue is that scheduling data update is difficult.

One or more aspects of the present invention are directed to a programmable display, an update processing apparatus, a data updating method, an information processing method, and a program for increasing the convenience for the user in updating the file group stored in the programmable display by solving the first issue and/or the second issue.

Solution to Problem

One aspect of the present invention provides a programmable display including a memory unit that stores a first file group, an obtaining unit that obtains a second file group, an extraction unit that extracts, from the second file group, at least one file different from any of files included in the first file group as a difference file, and a writing unit that updates the first file group by writing the at least one difference file to the memory unit.

In some embodiments, the programmable display further includes a display unit, an estimate unit that estimates a first time taken for writing the at least one difference file to the memory unit based on a file size and a file count of the at least one difference file, and a display control unit that displays the first time estimated by the estimate unit on the display unit.

In some embodiments, the estimate unit estimates a second time taken for writing the second file group to the memory unit based on a file size and a file count of files included in the second file group, and the display control unit displays the second time on the display unit.

In some embodiments, the programmable display further includes an input unit that receives an instruction for selecting a difference writing process for writing the at least one difference file to the memory unit or an all-file writing process for writing the second file group to the memory unit. The writing unit updates the first file group by writing the at least one difference file to the memory unit when the input unit receives an instruction for selecting the difference writing process or by writing the second file group to the memory unit when the input unit receives an instruction for selecting the all-file writing process.

In some embodiments, the programmable display further includes an input unit that receives an instruction specifying a file type. The at least one difference file includes a plurality of difference files. When the input unit receives the instruction specifying the file type, the writing unit writes, to the memory unit, a file having the file type specified by the instruction selectively from the plurality of difference files.

In some embodiments, the programmable display further includes a connecting unit that connects to a memory medium storing the second file group. The obtaining unit obtains the second file group from the memory medium connected to the connecting unit.

In some embodiments, the memory unit stores first information listing information about each file included in the first file group. The obtaining unit obtains second information listing information about each file included in the second file group. The extraction unit extracts the at least one difference file based on a comparison between the first information and the second information.

Another aspect of the present invention provides an update processing apparatus for updating a first file group in the programmable display that includes a memory unit for storing the first file group. The apparatus includes an obtaining unit that obtains a second file group, an extraction unit that extracts, from the second file group, at least one file different from any of files included in the first file group as a difference file, an estimate unit that estimates a first time taken for writing the at least one difference file to the memory unit based on a file size and a file count of the at least one difference file, and an output unit that outputs the first time.

In some embodiments, the estimate unit estimates a second time taken for writing the second file group to the memory unit based on a file size and a file count of files included in the second file group. The output unit outputs the second time.

Another aspect of the present invention provides a data updating method for updating a first file group in a programmable display that includes a memory unit for storing the first file group. The method includes obtaining a second file group, extracting, from the second file group, at least one file different from any of files included in the first file group as a difference file, and updating the first file group by writing the at least one difference file to the memory unit.

Another aspect of the present invention provides an information processing method for updating a first file group in a programmable display that includes a memory unit for storing the first file group. The method includes obtaining a second file group, extracting, from the second file group, at least one file different from any of files included in the first file group as a difference file, estimating a first time taken for writing the at least one difference file to the memory unit based on a file size and a file count of the at least one difference file, and outputting the first time.

Another aspect of the present invention provides a program for controlling a programmable display that includes a memory unit for storing a first file group. The program enables a processor of the programmable display to implement obtaining a second file group, extracting, from the second file group, at least one file different from any of files included in the first file group as a difference file, and updating the first file group by writing the at least one difference file to the memory unit.

Another aspect of the present invention provides a program for controlling an update processing apparatus that updates a first file group in a programmable display including a memory unit for storing the first file group. The program enables a processor of the update processing apparatus to implement obtaining a second file group, extracting, from the second file group, at least one file different from any of files included in the first file group as a difference file, estimating a first time taken for writing the at least one difference file to the memory unit based on a file size and a file count of the at least one difference file, and outputting the first time.

Advantageous Effects

One or more embodiments of the present invention may improve the convenience for the user in updating a file group stored in the programmable display.

BRIEF DESCRIPTION OF THE DRAWINGS

FIG. 3 is a diagram showing an example of a first manifest file stored in the programmable display.

FIG. 7 is a diagram describing a method for calculating the update time taken for writing files.

DETAILED DESCRIPTION

Figure 1:
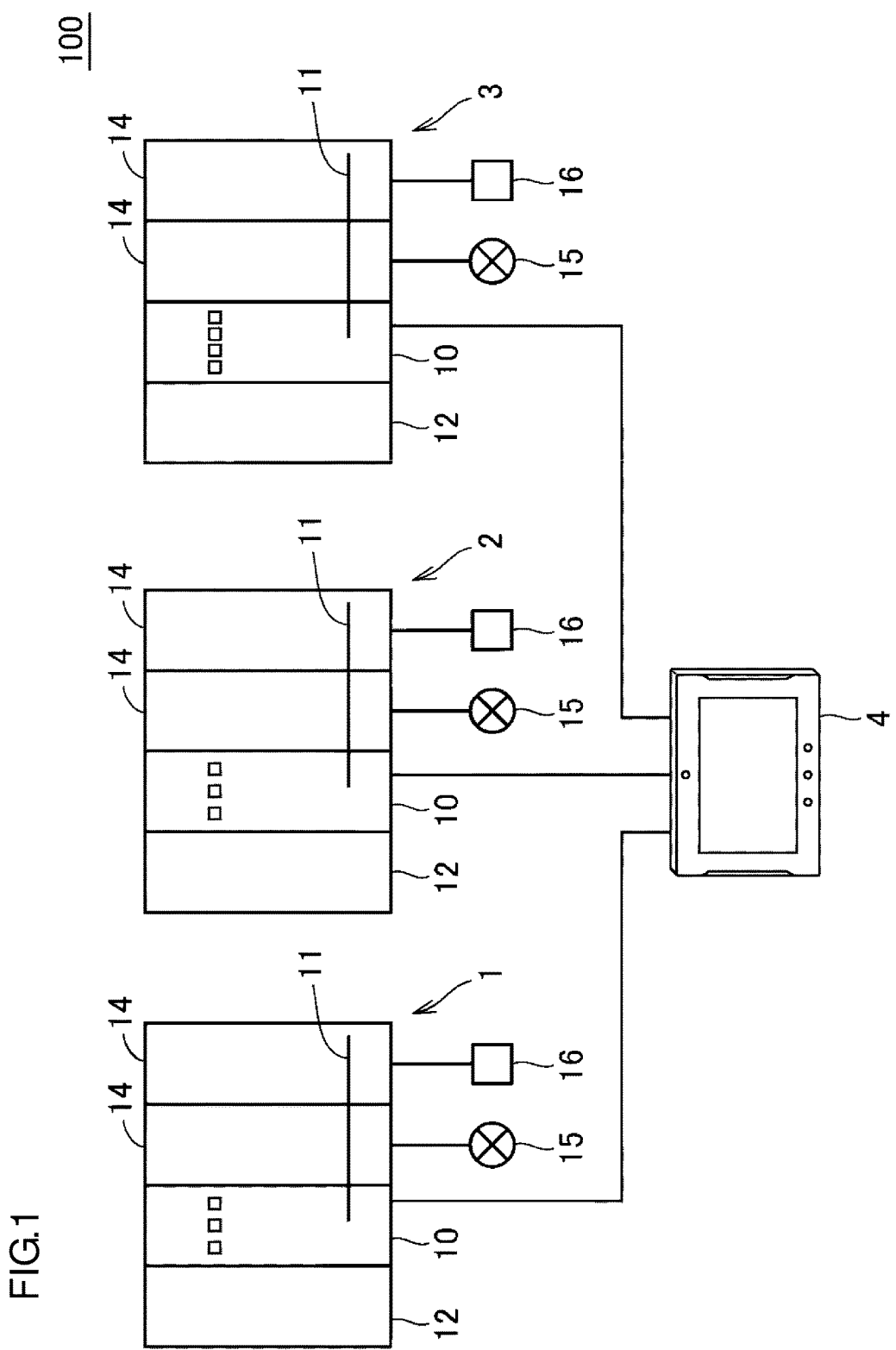
FIG. 1 is a schematic diagram of a PLC system according to a first embodiment.

Embodiments of the present invention will now be described in detail with reference to the drawings. The same or corresponding components in the figures are given the same reference numerals, and will not be described redundantly.

First Embodiment

System Configuration

FIG. 1 is a schematic diagram of a PLC system 100 according to the present embodiment. As shown in FIG. 1, the PLC system 100 includes a plurality of programmable logic controllers (PLCs) (PLC 1, PLC 2, and PLC 3) and a programmable display 4.

Each of the PLCs 1 to 3 is a controller used to control the operation of a machine or equipment. Each of the PLCs 1 to 3 typically includes a central processing unit (CPU) 10, which executes programs, a power supply unit 12 for supplying power to the CPU 10 and other components, and input/output (IO) units 14 for transmitting and receiving signals to and from a field. The IO units 14 are connected to the CPU 10 with a system bus 11. The IO units 14 typically obtain an input signal from a detection sensor 15, which is a field device, and also drive a relay 16, which is a field device, in accordance with the execution result of a program executed by the CPU 10.

The programmable display 4 functions as a graphical user interface (GUI) in a human machine interface (HMI) environment. The programmable display 4 communicates with the CPUs 10 of the PLCs 1 to 3, and performs various processes, including displaying information about each of the PLCs 1 to 3 and input processes for transferring instructions input from a user to the PLCs 1 to 3.

In the present embodiment, the PLCs 1 to 3 are connected to the programmable display 4 in a communicable manner with communication schemes described below. The PLC 1 communicates with the programmable display 4 with the Factory Interface Network Service (FINS). The PLC 2 communicates with the programmable display 4 with Hyper Text Transfer Protocol (HTTP) communication. The PLC 3 communicates with the programmable display 4 with Ethernet (registered trademark)/IP (EIP) communication.

Functional Configuration of Programmable Display

Figure 2:
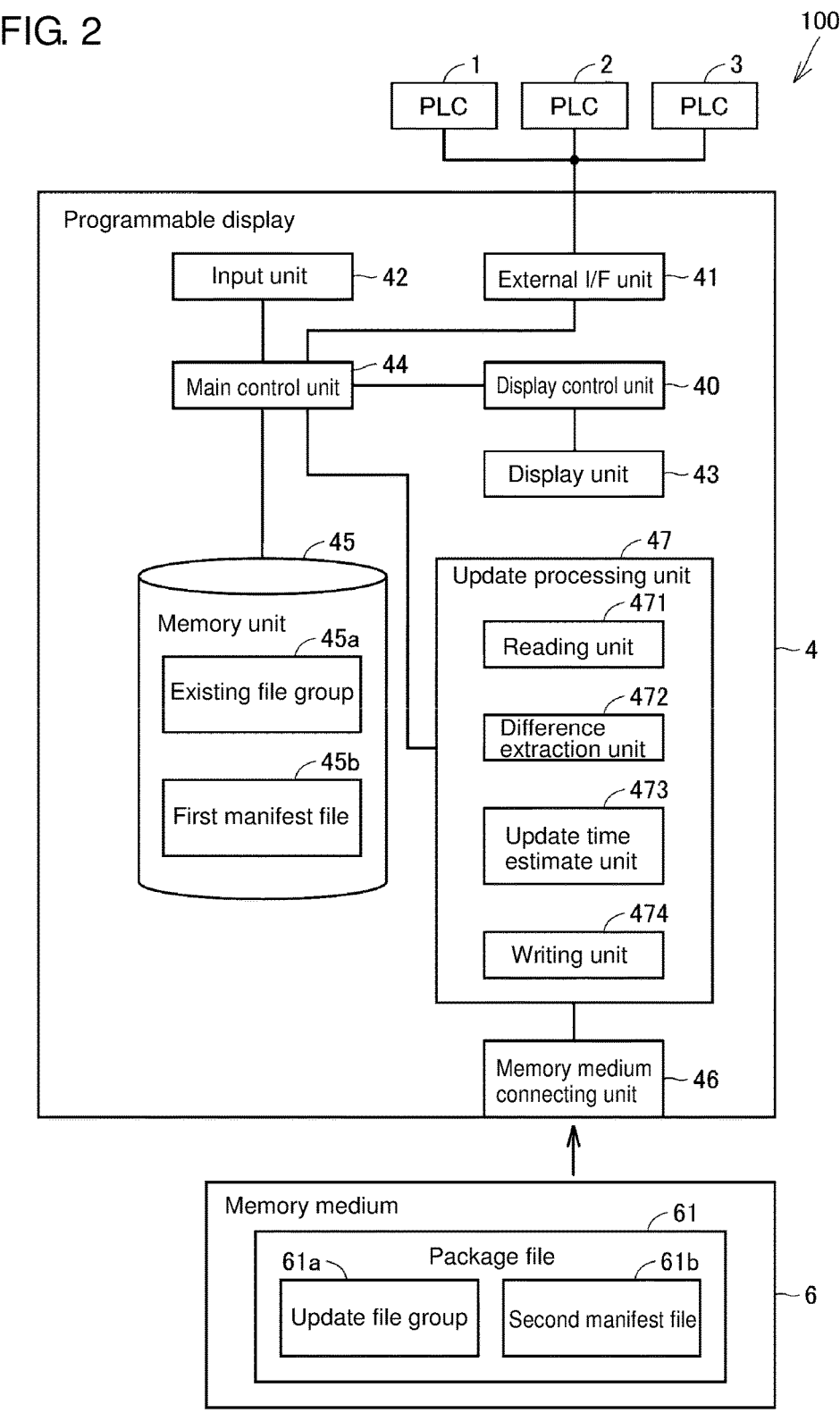
FIG. 2 is a functional diagram of a programmable display included in the PLC system according to the first embodiment.

FIG. 2 is a functional diagram of the programmable display 4. As shown in FIG. 2, the programmable display 4 includes an external interface (I/F) unit 41, an input unit 42, a display unit 43, a display control unit 40, a main control unit 44, a memory unit 45, a memory medium connecting unit 46, and an update processing unit 47.

The external I/F unit 41 is connected to the PLCs 1 to 3 to allow information communication among them. For example, the external I/F unit 41 receives information indicating the operating status (hereafter referred to as operating status information) from each of the PLCs 1 to 3, and outputs the received information to the main control unit 44. The external I/F unit 41 also transmits instructions received from the main control unit 44 to the PLCs 1 to 3.

The input unit 42 receives input information from the user, and outputs the input information to the main control unit 44 or the update processing unit 47. The input unit 42 may be a touch panel.

The display unit 43 displays screens for, for example, presenting information to the user or prompting a user operation. The display unit 43 may be a liquid crystal display.

The display control unit 40 controls the screen appearing on the display unit 43 in accordance with instructions from the main control unit 44.

The memory unit 45 includes a nonvolatile memory, and stores an existing file group 45a, which is to be used to operate the programmable display 4, and a first manifest file (first information) 45b, which lists sets of information about the files contained in the existing file group 45a (hereafter referred to as file information).

The existing file group 45a includes, for example, system firmware, which is used to operate the programmable display 4, control programs, resource data including image data for parts of each display screen, and recipe data, which is to be written to the PLCs 1 to 3.

FIG. 3 is a diagram showing an example of the first manifest file 45b. As shown in FIG. 3, the first manifest file 45b includes at least file names, file sizes, and hash values as sets of information about the files contained in the existing file group 45a.

The main control unit 44 generates screen data in accordance with the existing file group 45a stored in the memory unit 45, the operating status information received by the external I/F unit 41, and the input information received by the input unit 42, and displays a screen represented by the generated screen data on the display unit 43. The main control unit 44 also generates instruction information for the PLCs 1 to 3 in accordance with the existing file group 45a, the operating status information, and the input information, and transmits the generated instruction information to the PLCs 1 to 3 through the external I/F unit 41.

To update the existing file group 45a stored in the memory unit 45, the main control unit 44 outputs the information received by the input unit 42 to the update processing unit 47 and controls each unit in accordance with an instruction from the update processing unit 47. In response to an instruction from the update processing unit 47, for example, the main control unit 44 instructs the display control unit 40 to change the screen or output the data read from the memory unit 45 to the update processing unit 47.

The memory medium connecting unit 46 includes a slot to which a memory medium 6 is inserted, and is connectable to the memory medium 6 inserted in the slot. The slot of the memory medium connecting unit 46 is shaped in correspondence with the memory medium 6 to be connected. A memory medium to be connected to the memory medium connecting unit 46 may be a memory card, such as an SD memory card, and a universal serial bus (USB) memory device.

To update the existing file group 45a stored in the memory unit 45, the user inserts the memory medium 6 storing a package file 61 generated for the update into the slot of the memory medium connecting unit 46.

The package file 61 includes a new file group used to operate the programmable display 4 (hereafter referred to as an update file group) 61a and a second manifest file (second information) 61b, which lists sets of information about files contained in the update file group 61a.

In the same manner as the first manifest file 45b shown in FIG. 3, the second manifest file 61b includes at least file names, file sizes, and hash values as sets of information about the files contained in the update file group 61a.

The update processing unit 47 updates the existing file group 45a stored in the memory unit 45 using the package file 61 stored in the memory medium 6 that is connected to the memory medium connecting unit 46. As shown in FIG. 2, the update processing unit 47 includes a reading unit 471, a difference extraction unit 472, an update time estimate unit 473, and a writing unit 474.

When the memory medium 6 is connected to the memory medium connecting unit 46, the reading unit 471 reads the package file 61 from the memory medium 6. In other words, the reading unit 471 functions as an obtaining unit that obtains the package file 61.

The difference extraction unit 472 extracts, from the update file group 61a included in the package file 61 read from the memory medium 6, files that are different from the files contained in the existing file group 45a stored in the memory unit 45 as difference files. The difference extraction unit 472 compares the second manifest file 61b included in the package file 61 with the first manifest file 45b stored in the memory unit 45 to identify the difference files. The specific processing performed by the difference extraction unit 472 will be described later.

The update time estimate unit 473 estimates the time taken to update the existing file group 45a. More specifically, the update time estimate unit 473 calculates a first update time taken when only the difference files are written to the memory unit 45 to update the existing file group 45a (hereafter referred to as a difference writing process) and a second update time taken when all the files in the update file group 61a are written to the memory unit 45 to update the existing file group 45a (hereafter referred to as an all-file writing process).

The update time estimate unit 473 outputs the calculated update times to the main control unit 44. The main control unit 44 outputs an instruction for displaying a screen including these update times received from the update time estimate unit 473 to the display control unit 40. In response to this instruction, the display control unit 40 displays the screen including the update times on the display unit 43.

The update time estimate unit 473 calculates the update times based on the size of each file to be written (file size). The specific processing performed by the update time estimate unit 473 will be described later.

The writing unit 474 performs either the difference writing process or the all-file writing process in accordance with an instruction input into the input unit 42. The specific processing performed by the writing unit 474 will be described later.

Update Processing

Figure 4:
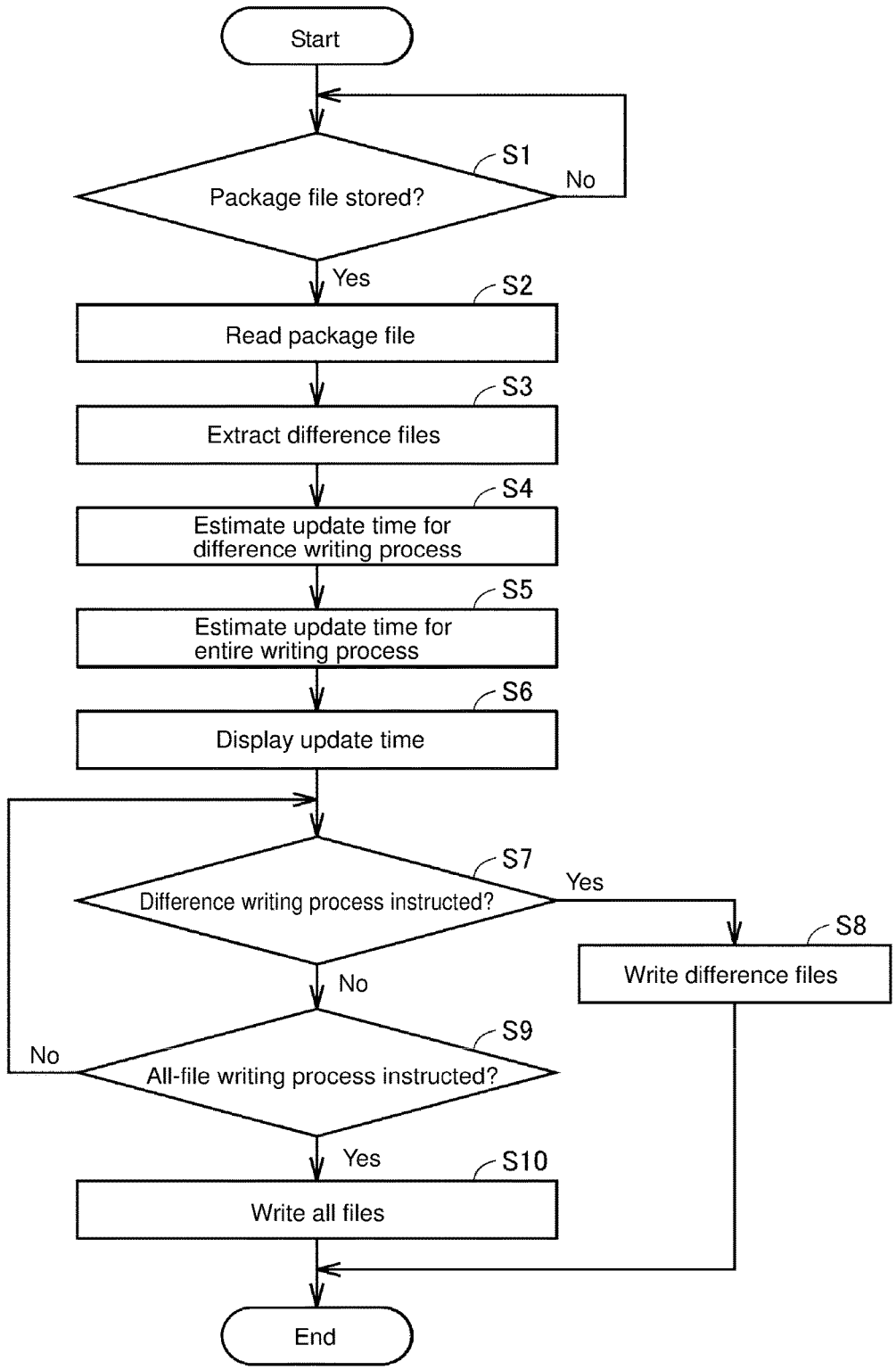
FIG. 4 is a flowchart showing the file update processing performed by the programmable display according to the first embodiment.

FIG. 4 is a flowchart showing the update processing performed by the programmable display 4. As shown in FIG. 4, the reading unit 471 determines whether the memory medium 6 inserted in the slot of the memory medium connecting unit 46 stores any package file 61 (step S1).

When the memory medium 6 stores no package file 61 (No in step S1), the processing returns to the processing in step S1. When the memory medium 6 stores a package file 61 (Yes in step S1), the reading unit 471 reads the package file 61 from the memory medium 6 (step S2).

When the memory medium 6 stores a plurality of package files 61, the reading unit 471 displays a selection screen on the display unit 43 for prompting the user to select one of the package files 61. The reading unit 471 then reads, from the memory medium 6, one of the package files 61 specified by an instruction input to the input unit 42.

Figure 5:
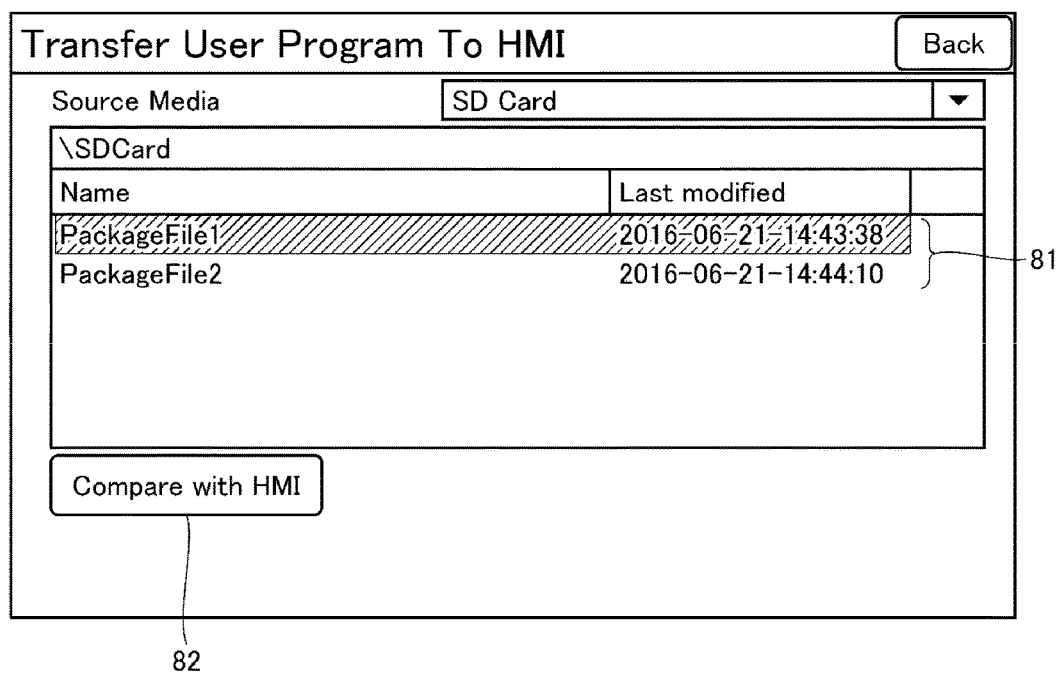
FIG. 5 is a diagram showing an example of a selection screen for prompting the user to select a package file.

FIG. 5 is a diagram showing an example of the selection screen for prompting the user to select a package file 61. As shown in FIG. 5, the reading unit 471 displays a selection screen containing a list 81 of the file names of a plurality of package files 61 and a button 82 for completing the selection. When the reading unit 471 detects that the button 82 has been pressed with one of the file names being selected from the list 81, the reading unit 471 reads the package file 61 with the selected file name from the memory medium 6.

The difference extraction unit 472 then compares the second manifest file 61b included in the package file 61 read in step S2 with the first manifest file 45b stored in the memory unit 45 to extract difference files from the update file group 61a (step S3).

Figure 6:
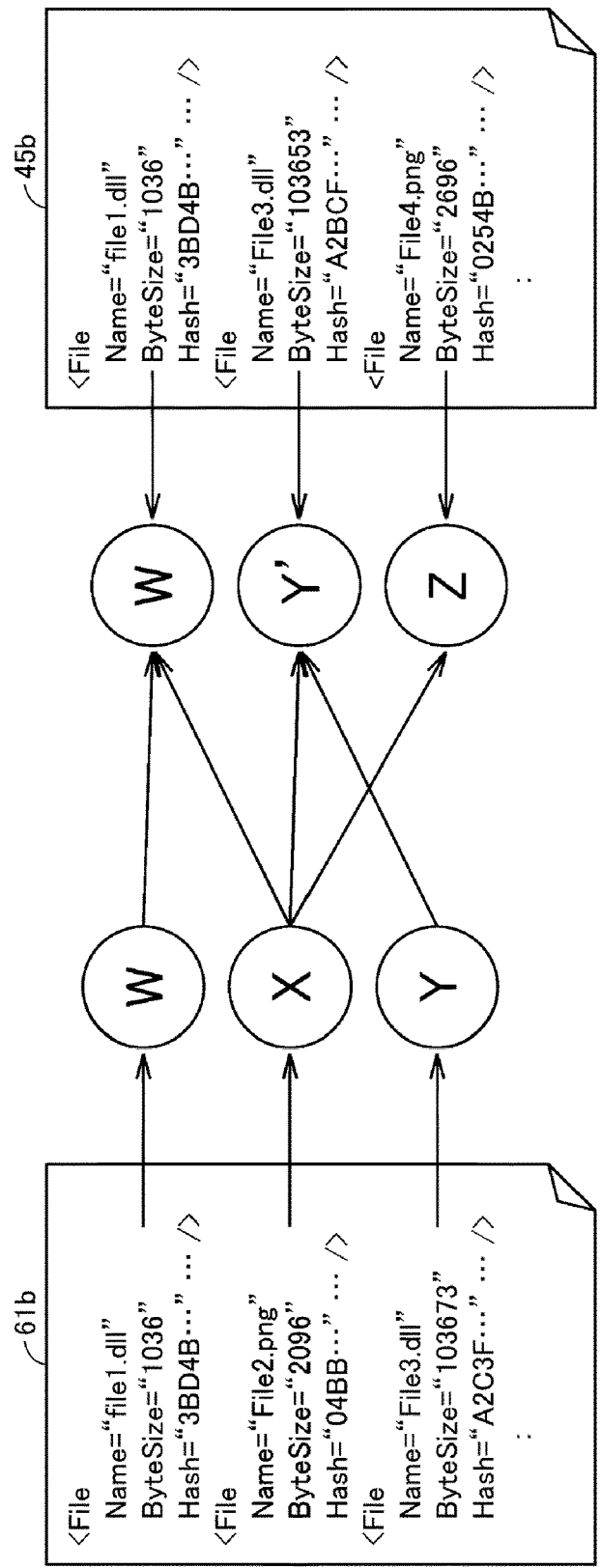
FIG. 6 is a diagram describing a method for extracting difference files.

FIG. 6 is a diagram describing a method for extracting difference files used by the difference extraction unit 472. The difference extraction unit 472 determines, for each set of file information included in the second manifest file 61b, whether the first manifest file 45b includes any set of file information having the same file name as any set of file information included in the second manifest file 61b. In FIG. 6, file information sets W and Y included in the second manifest file 61b have the same file names as those in file information sets W and Y' included in the first manifest file 45b.

When the first manifest file 45b and the second manifest file 61b contain sets of file information with the same file name, the difference extraction unit 472 reads the sets of file information with the same file name from the first manifest file 45b and the second manifest file 61b. The difference extraction unit 472 compares the read two sets of file information, and determines whether they have the same file size and the same hash value based on the comparison result.

When the sets of file information have the same file size and the same hash value, the difference extraction unit 472 determines that the files corresponding to the sets of file information with the file size and the hash value are stored in both the package file 61 and the memory unit 45. In FIG. 6, the two sets of file information W have the same file size and the same hash value.

When the sets of file information have different file sizes and/or different hash values, the difference extraction unit 472 determines that the files corresponding to the sets of file information with the different file sizes and the different hash values are files with changes, or specifically files changed from the files with the same name stored in the memory unit 45. In FIG. 6, the file information sets Y and Y' have the same file name but different file sizes and different hash values.

When the second manifest file 61b stores no set of file information with the same file name as in the first manifest file 45b, the difference extraction unit 472 determines that the file with the file name is to be newly added to the memory unit 45. In FIG. 6, the file represented by the file information X is to be newly added.

In this manner, the difference extraction unit 472 extracts, as difference files, files with changes or files to be added from the update file group 61a.

When the first manifest file 45b stores any set of file information with the same file name that is not the same as in the second manifest file 61b, the difference extraction unit 472 determines that the file with the file name is to be deleted from the memory unit 45. In FIG. 6, the file represented by the file information Z is to be deleted.

The update time estimate unit 473 then calculates the first update time taken for the difference writing process for writing the difference files extracted in step S3 to the memory unit 45 (step S4).

FIG. 7 is a diagram describing a method for calculating the first update time taken for the difference writing process. As shown in FIG. 7, the update time estimate unit 473 preliminarily stores a writing speed table 83 showing the average writing speed (sec/file) for writing files to the memory unit 45 for each predetermined file size.

Files used for operating the programmable display 4 typically have relatively small sizes (such as thumbnail image data with less than 4 KB). Storing a plurality of files with relatively small sizes (with a total file size of A) to the memory unit 45 takes more time than storing one file with the file size of A to the memory unit 45. The writing speed table 83 thus defines the average writing speed for a class of files with smaller sizes to use a smaller capacity for writing per unit time.

The update time estimate unit 473 refers to the second manifest file 61b to determine the appropriate class for each difference file in the writing speed table in accordance with the file size. The update time estimate unit 473 also counts the number of difference files in each class.

The update time estimate unit 473 then calculates the estimated writing time by multiplying the corresponding average writing speed by the counted number of files for each class. The update time estimate unit 473 uses the total of the estimated writing times calculated for different classes as the first update time taken for the difference writing process.

The update time estimate unit 473 then calculates the second update time taken for the all-file writing process for writing all the files in the update file group 61a included in the package file 61 to the memory unit 45 (step S5). The update time estimate unit 473 uses the same method as shown in FIG. 7 for calculating the second update time.

The update time estimate unit 473 outputs the update times calculated in steps S4 and S5 to the main control unit 44. The main control unit 44 outputs an instruction for displaying a screen (update time window) including these update times received from the update time estimate unit 473 to the display control unit 40. In response to this instruction, the display control unit 40 displays the update time window on the display unit 43 (step S6).

Figure 8:
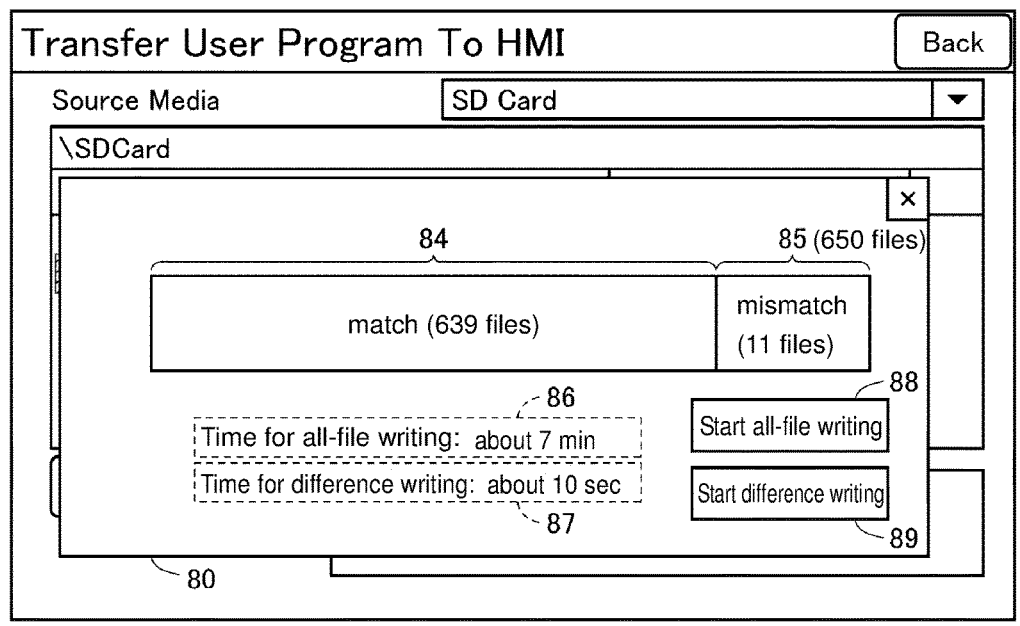
FIG. 8 is a diagram showing an example of an update time window.

FIG. 8 is a diagram showing an example of the update time window. As shown in FIG. 8, the display control unit 40 displays, on the display unit 43, an update time window 80 including an area 84 showing the number of files included in the update file group 61a excluding difference files (files labeled as "match" in the figure), an area 85 showing the number of difference files (files labeled as "mismatch" in the figure), an area 86 showing the second update time taken for the all-file writing process, an area 87 showing the first update time taken for the difference writing process, a button for instructing to start the all-file writing process (all-file writing start button) 88, and a button for instructing to start the difference writing process (difference writing start button) 89.

The writing unit 474 then determines whether the difference writing start button 89 has been pressed (step S7). When the difference writing start button 89 has been pressed (Yes in step S7), the writing unit 474 writes the difference files extracted in step S3 to the memory unit 45 (step S8), and ends the processing.

More specifically, in step S8, when the existing file group 45a includes files with the same names as the difference files to be written, the writing unit 474 overwrites the files in the existing file group 45a with the difference files. When the existing file group 45a includes no files with the same names as the difference files to be written, the writing unit 474 adds the difference files to the memory unit 45 as the files of the existing file group 45a.

In step S8, the writing unit 474 deletes the files with the names that are included in the first manifest file 45b and are not included in the second manifest file 61b (in other words, files determined by the difference extraction unit 472 to be deleted) from the existing file group 45a.

In step S8, the writing unit 474 updates the first manifest file 45b stored in the memory unit 45 at the same time as the update of the existing file group 45a. In other words, the writing unit 474 overwrites the first manifest file 45b with the second manifest file 61b into the memory unit 45, and the second manifest file 61b will be used as the updated first manifest file 45b.

When the difference writing start button 89 has not been pressed (No in step S7), the writing unit 474 determines whether the all-file writing start button 88 has been pressed (step S9).

When the all-file writing start button 88 has not been pressed (No in step S9), the processing returns to the processing in step S7. When the all-file writing start button 88 has been pressed (Yes in step S9), the writing unit 474 performs the all-file writing process for writing the update file group 61a to the memory unit 45 (step S10), and ends the processing.

The all-file writing process in step S10 differs from the difference writing process in step S8 in that the update file group 61a is written instead of difference files. The writing unit 474 thus may perform the all-file writing process for the update file group 61a, which is to be written, by performing the same processing as in step S8.

Hardware Configuration

Figure 9:
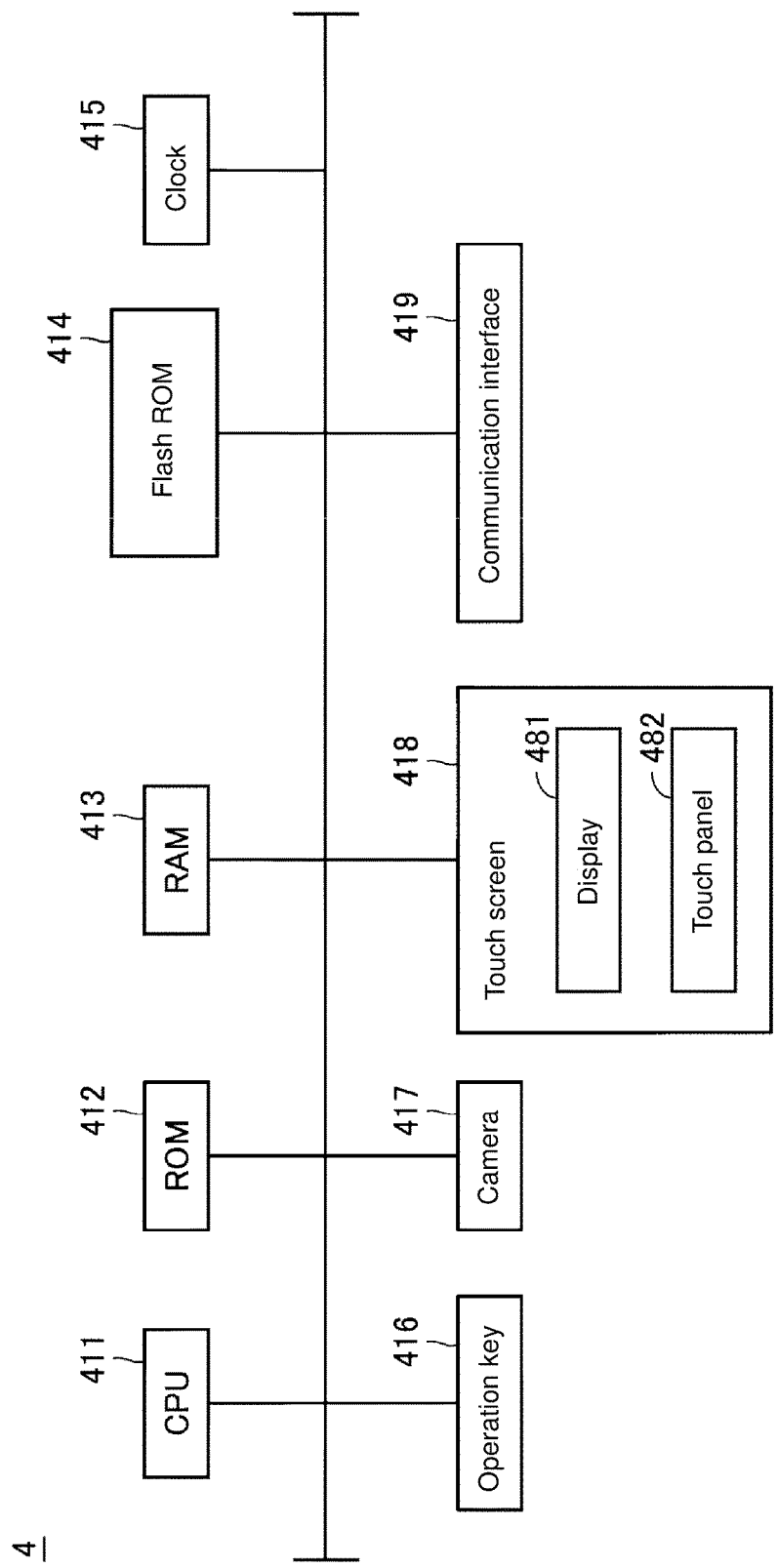
FIG. 9 is a diagram showing the hardware configuration of the programmable display in one example.

FIG. 9 is a diagram showing the hardware configuration of the programmable display 4 in one example. As shown in FIG. 9, the programmable display 4 includes a CPU 411, which performs various operations, a read only memory (ROM) 412, a random access memory (RAM) 413, a flash ROM 414, which functions as the memory unit 45 and stores various programs in a nonvolatile manner, a clock 415, an operation key 416, a camera 417, a touch screen 418, and a communication interface 419. These components are connected to each other with an internal bus.

The touch screen 418 includes a display 481, which functions as the display unit 43, and a touch panel 482, which functions as the input unit 42. The touch panel 482 covers the display 481.

The communication interface 419, which functions as the external I/F unit 41 and the memory medium connecting unit 46, uses one of various interfaces for communication, such as Ethernet (registered trademark), serial communication, and USB communication. The programmable display 4 communicates with each electronic device, such as the PLCs 1 to 3, via the communication interface 419.

The CPU 411 reads a program stored in the flash ROM 414, expands it in the RAM 413 and executes it. The ROM 412, which functions as the memory unit 45, typically stores programs including an operating system (OS). The RAM 413 is a volatile memory and is used as a working memory.

The components of the programmable display 4 shown in FIG. 9 are typical components. Thus, the essential part may be software stored in the memories such as the flash ROM 414 or software downloadable through a network. The operation of each hardware component of the programmable display 4 is known, and will not be described in detail.

Structure and Effects of First Embodiment

As described above, the programmable display 4 includes the memory unit 45, which is used to store the existing file group (first file group) 45a, the reading unit 471, which functions as an obtaining unit for obtaining the update file group (second file group) 61a, the difference extraction unit 472, which extracts, from the update file group 61a, difference files that are different from files in the existing file group 45a, and the writing unit 474, which updates the existing file group 45a by writing the difference files to the memory unit 45.

In this manner, the writing unit 474 can shorten the time taken for the update by writing the difference files to the memory unit 45, instead of performing the all-file writing process for writing all the files in the update file group 61a to the memory unit 45. This structure improves the convenience for the user in updating the existing file group 45a stored in the memory unit 45.

The programmable display 4 also includes the update time estimate unit 473, which estimates the first update time (first time) taken for writing the difference files to the memory unit 45 and the second update time (second time) taken for writing all the files in the update file group 61a to the memory unit 45, and the display control unit 40, which displays the update times on the display unit 43.

This allows the user to estimate the time taken for the difference writing process and thus to easily schedule the update operation. The user can also determine the time taken for the all-file writing process, and thus can recognize the time shortened by performing the difference writing process instead of performing the all-file writing process.

The programmable display 4 includes the input unit 42, which receives an instruction for selecting either of the difference writing process or the all-file writing process. When the input unit 42 receives an instruction for selecting the difference writing process, the writing unit 474 writes difference files to the memory unit 45. When the input unit 42 receives an instruction for selecting the all-file writing process, the writing unit 474 writes the update file group 61a to the memory unit 45.

This allows the user to select the difference writing process or the all-file writing process in accordance with the situation by comparing the first update time taken for the difference writing process and the second update time taken for the all-file writing process. This further improves the convenience for the user in updating the existing file group 45a.

The unit combining the update processing unit 47 and the display control unit 40 of the programmable display 4 corresponds to an update processing apparatus that updates the existing file group (first file group) 45a of the programmable display 4. As described above, the update processing unit 47 includes the reading unit 471, which obtains the update file group 61a, the difference extraction unit 472, which extracts difference files, and the update time estimate unit 473, which estimates the first update time taken for writing the difference files to the memory unit 45. The display control unit 40 functions as an output unit that displays the first update time on the display unit 43.

This allows the user to estimate the time taken for the difference writing process and thus to easily schedule the update operation. This improves the convenience for the user in updating the existing file group 45a stored in the memory unit 45.

Second Embodiment

A programmable display according to a second embodiment is a modification of the programmable display according to the first embodiment described above.

Although the programmable display 4 obtains the update file group 61a from the memory medium 6 in the first embodiment, the programmable display 4 may obtain the update file group 61a from a source other than the memory medium 6. In the second embodiment, the programmable display obtains the update file group 61a from a personal computer (PC).

Figure 10:
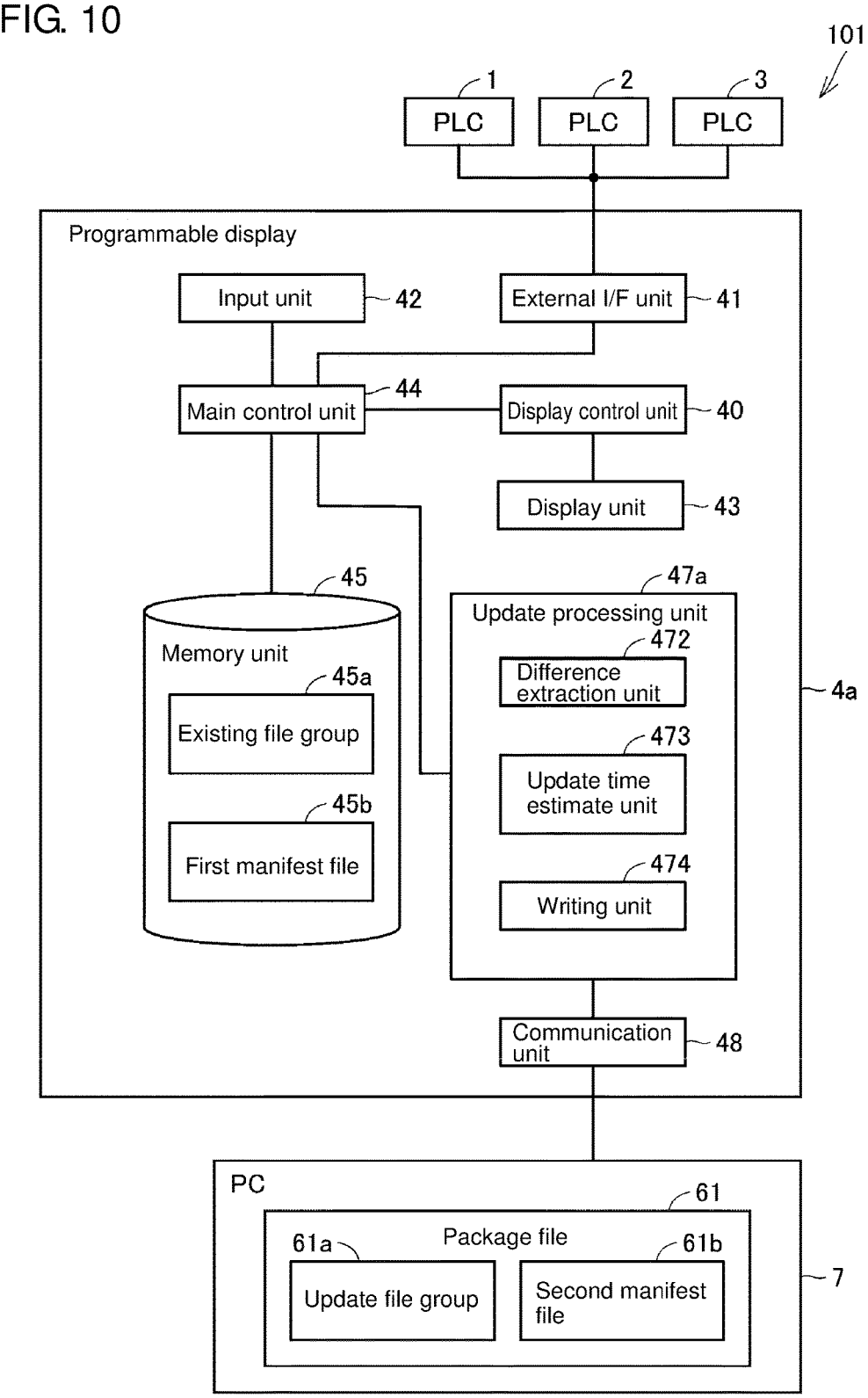
FIG. 10 is a diagram showing the configuration of a PLC system according to a second embodiment.

FIG. 10 is a diagram showing the configuration of a PLC system 101 including a programmable display 4a according to the second embodiment. As shown in FIG. 10, the PLC system 101 according to the second embodiment includes PLCs 1 to 3, the programmable display 4a, and a PC 7.

The PC 7 stores a package file 61 including an update file group 61a and a second manifest file 61b in its internal storage.

The PC 7 may generate the package file 61 by executing a program for generating update files or may obtain the package file 61 from another information processing apparatus.

The programmable display 4a differs from the programmable display 4 according to the first embodiment in its update processing unit 47a, which replaces the update processing unit 47, and its communication unit 48, which replaces the memory medium connecting unit 46. The update processing unit 47a differs from the update processing unit 47 in that it eliminates the reading unit 471.

The communication unit 48 communicates with the PC 7 to obtain the package file 61 from the PC 7, and outputs the package file 61 to the update processing unit 47a.

The update processing unit 47a includes a difference extraction unit 472, an update time estimate unit 473, and a writing unit 474 that perform the same processing as the corresponding components in the first embodiment for the package file 61 output from the communication unit 48. When the package file 61 is encrypted or compressed for secure communication between the PC 7 and the programmable display 4a or for higher communication speed, the update processing unit 47a first expands the package file 61 and then performs the same processing as described in the first embodiment.

Third Embodiment

Figure 11:
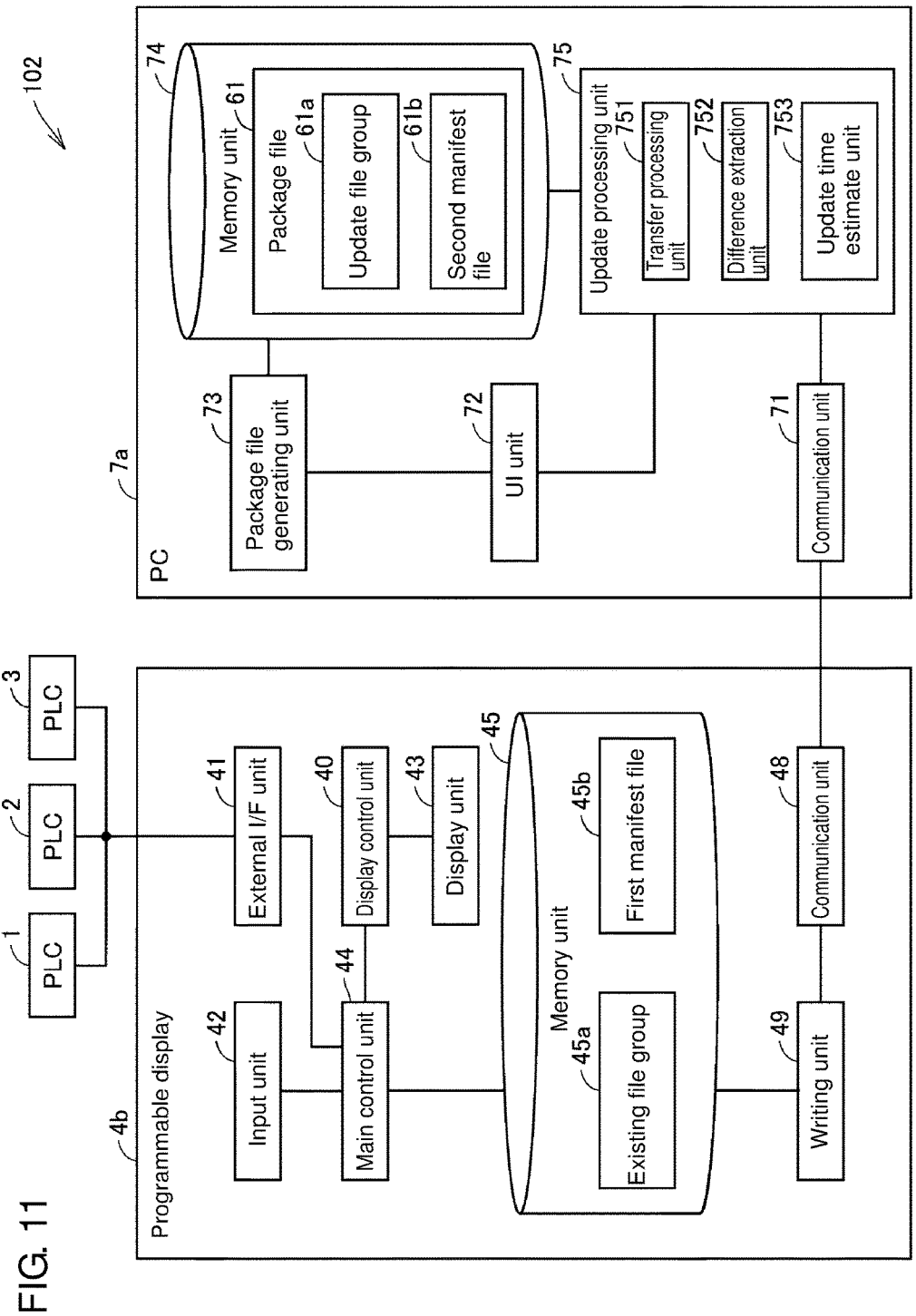
FIG. 11 is a diagram showing the configuration of a PLC system according to a third embodiment.

FIG. 11 is a diagram showing the configuration of a PLC system 102 according to a third embodiment. As shown in FIG. 11, the PLC system 102 includes PLCs 1 to 3, a programmable display 4b, and a PC 7a.

The programmable display 4b differs from the programmable display 4 according to the first embodiment in its writing unit 49, which replaces the update processing unit 47, and its communication unit 48, which replaces the memory medium connecting unit 46.

The communication unit 48 communicates with the PC 7a. In response to a request from the PC 7a for transmitting the existing file group 45a, the communication unit 48 transmits the existing file group 45a and the first manifest file 45b stored in the memory unit 45 to the PC 7a. The communication unit 48 receives either difference files, or the update file group 61a and the second manifest file 61b from the PC 7a, and outputs the files to the writing unit 49.

The writing unit 49 writes the difference files or the files included in the update file group 61a received from the communication unit 48 to the memory unit 45. In the same manner as the writing unit 474 in the first embodiment, when the existing file group 45a includes files with the same names as the files to be written, the writing unit 49 overwrites the files in the existing file group 45a with the difference files. When the existing file group 45a includes no files with the same names as the files to be written, the writing unit 49 adds the files to the memory unit 45.

The writing unit 49 deletes the files with the names that are included in the first manifest file 45b and are not included in the second manifest file 61b from the existing file group 45a.

The writing unit 49 overwrites the first manifest file 45b with the second manifest file 61b received from the communication unit 48 into the memory unit 45, and the second manifest file 61b will be used as the updated first manifest file 45b.

The PC 7a includes a communication unit 71, a user interface (UI) unit 72, a package file generating unit 73, a memory unit 74, and an update processing unit 75.

The communication unit 71 communicates with the programmable display 4b. In response to an instruction from the update processing unit 75, the communication unit 71 transmits a request for transmitting the existing file group 45a to the programmable display 4b, and receives the existing file group 45a and the first manifest file 45b. The communication unit 71 also transmits either difference files, or the update file group 61a and the second manifest file 61b output from the update processing unit 75 to the programmable display 4b.

The UI unit 72 has display and input capabilities for user operations. The UI unit 72 includes, for example, a liquid crystal display, a touch panel, a keyboard, and a mouse. When the UI unit 72 receives an instruction input for updating the existing file group 45a in the programmable display 4b, the UI unit 72 outputs the update instruction to the update processing unit 75.

The package file generating unit 73 generates, in response to an instruction input to the UI unit 72, the update file group 61a including various files that are used to operate the programmable display 4b.

The package file generating unit 73 also generates, for each generated file, each set of file information including the file name, the file size, and the hash value. The package file generating unit 73 then generates the second manifest file 61b including file information for each of the files included in the update file group 61a.

The package file generating unit 73 stores the package file 61 including the generated update file group 61a and the generated second manifest file 61b into the memory unit 74.

The update processing unit 75 updates the existing file group 45a in the programmable display 4b. As shown in FIG. 11, the update processing unit 75 includes a transfer processing unit 751, a difference extraction unit 752, and an update time estimate unit 753.

In response to an update instruction from the UI unit 72, the transfer processing unit 751 transmits a request for transmitting the obtained existing file group 45a to the programmable display 4b through the communication unit 71, and obtains the existing file group 45a and the first manifest file 45b. The transfer processing unit 751 also reads the package file 61 from the memory unit 74 in response to the update instruction. The transfer processing unit 751 outputs the existing file group 45a, the first manifest file 45b, the update file group 61a, and the second manifest file 61b to the difference extraction unit 752.

The difference extraction unit 752 extracts difference files from the update file group 61a based on the files received from the transfer processing unit 751. The difference extraction unit 752 uses the same extraction method as the difference extraction unit 472 in the first embodiment.

In the same manner as the update time estimate unit 473 in the first embodiment, the update time estimate unit 753 calculates update times taken for the difference writing process and the all-file writing process based on difference files extracted by the difference extraction unit 752 and the update file group 61a received from the transfer processing unit 751. The update time estimate unit 753 then displays an update time window 80 (refer to FIG. 8) including the calculated update times on the UI unit 72.

In response to an instruction for starting the difference writing process from the UI unit 72, the transfer processing unit 751 transmits the difference files extracted by the difference extraction unit 752 and the second manifest file 61b to the programmable display 4b through the communication unit 71.

In response to an instruction for starting the all-file writing process from the UI unit 72, the transfer processing unit 751 transmits the update file group 61a and the second manifest file 61b to the programmable display 4b through the communication unit 71.

Update Processing

Figure 12:
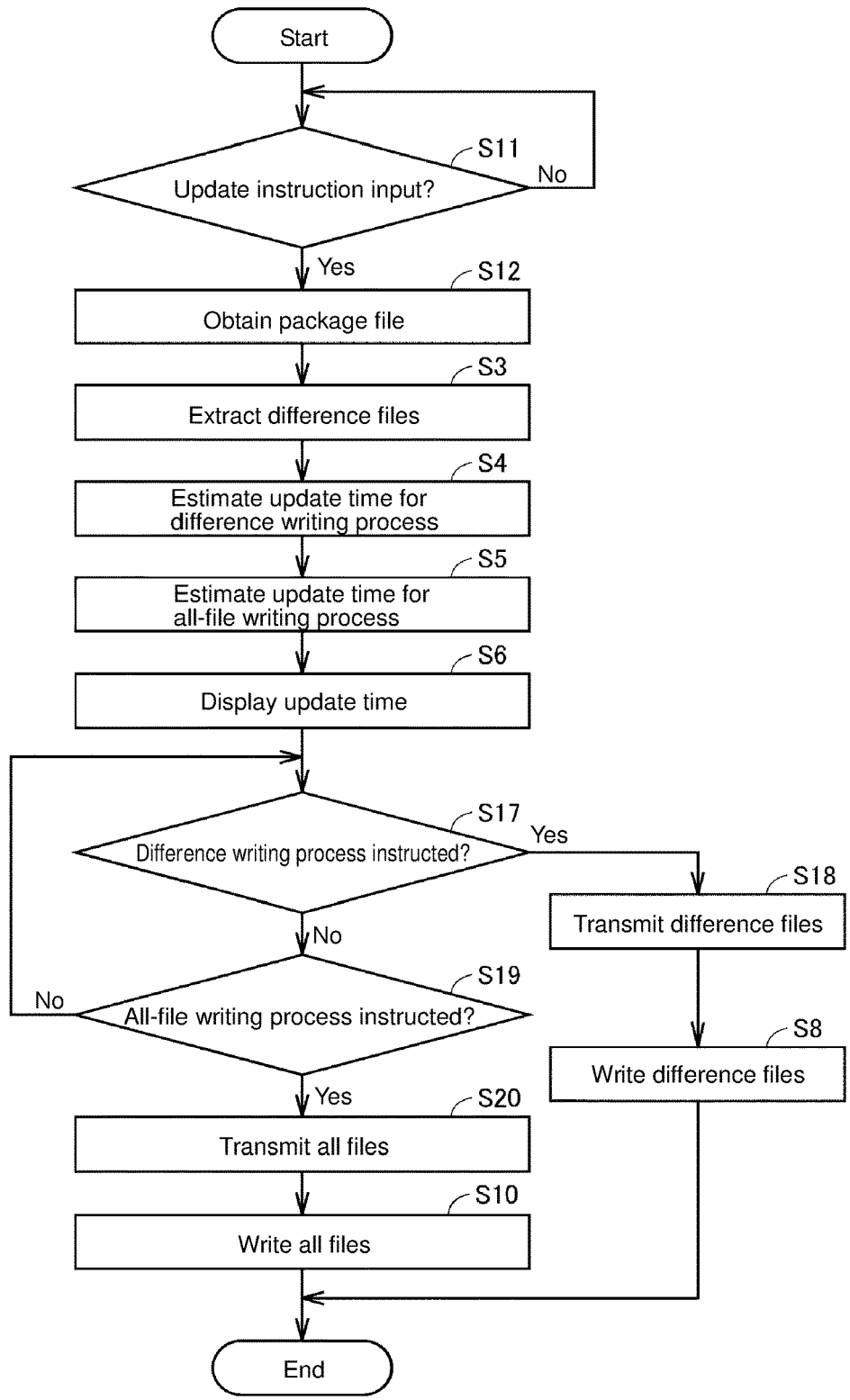
FIG. 12 is a flowchart showing the processing for updating files stored in a programmable display according to the third embodiment.

FIG. 12 is a flowchart showing the processing of updating the existing file group 45a in the programmable display 4b in the PLC system 102.

As shown in FIG. 12, the transfer processing unit 751 determines whether an update instruction has been input to the UI unit 72 (step S11). When no update instruction has been input, the processing returns to the processing in step S11.

When an update instruction is input (Yes in step S11), the transfer processing unit 751 obtains the existing file group 45a and the first manifest file 45b stored in the memory unit 45 of the programmable display 4b, and also obtains the package file 61 from the memory unit 74 (step S12).

The difference extraction unit 752 and the update time estimate unit 753 then perform the same processing as the processing in steps S3 to S6 described in the first embodiment. In step S6, the UI unit 72 in the PC 7a displays the update time window 80 as shown in FIG. 8. This allows the user to perform the update operation while checking the UI unit 72.

The transfer processing unit 751 then determines whether a difference writing start button 89 on the screen of the UI unit 72 has been pressed (step S17). When the difference writing start button 89 has been pressed (Yes in step S17), the transfer processing unit 751 transmits the difference files extracted in step S3 and the second manifest file 61b to the programmable display 4b through the communication unit 71 (step S18).

The writing unit 49 in the programmable display 4b then performs the same difference writing process as in step S8 described in the first embodiment based on the received difference files and the received second manifest file 61b.

When the difference writing start button 89 has not been pressed (No in step S17), the transfer processing unit 751 determines whether an all-file writing start button 88 on the screen of the UI unit 72 has been pressed (step S19). When the all-file writing start button 88 has not been pressed (No in step S19), the processing returns to the processing in step S17.

When the all-file writing start button 88 has been pressed (Yes in step S19), the transfer processing unit 751 transmits the update file group 61a and the second manifest file 61b to the programmable display 4b through the communication unit 71 (step S20).

The writing unit 49 in the programmable display 4b then performs the same all-file writing process as in step S10 described in the first embodiment based on the received update file group 61a and the received second manifest file 61b.

Hardware Configuration

Figure 13:
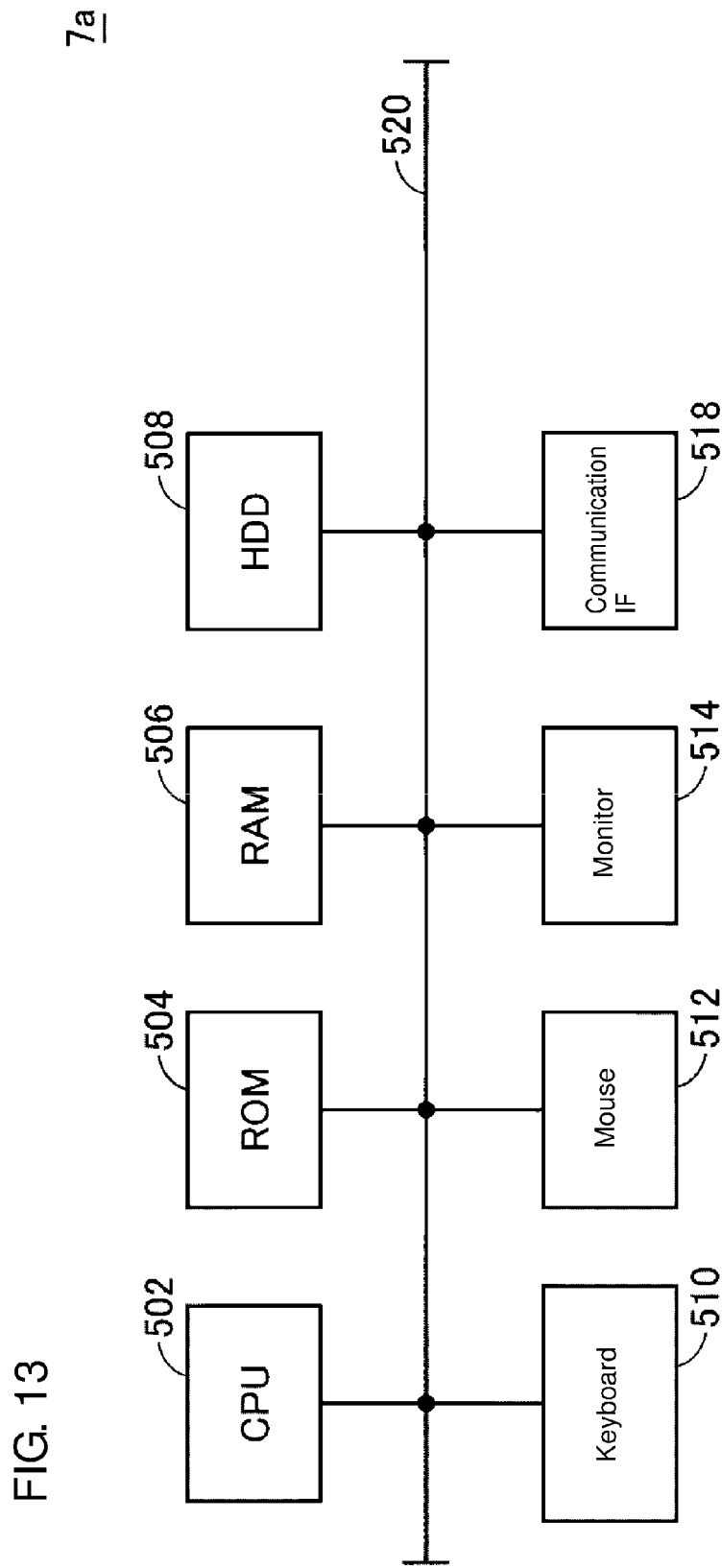
FIG. 13 is a schematic diagram showing the hardware configuration of a PC.

FIG. 13 is a schematic diagram showing the hardware configuration of the PC 7a in one example. As shown in FIG. 13, the PC 7a includes a CPU 502, which executes various programs including an OS, a ROM 504, which stores a basic input/output system (BIOS) and various data, a RAM 506, which provides a working area for storing data used to execute programs by the CPU 502, and a hard disk drive (HDD) 508, which stores programs executed by the CPU 502 in a nonvolatile manner.

The PC 7a also includes a keyboard 510 and a mouse 512 for receiving operations from a user, and a monitor 514 for presenting information to the user. The PC 7a further includes a communication interface (IF) 518 for communicating with devices such as the programmable display 4b. The PC 7b is connected to the programmable display 4b in a communicable manner via the communication IF 518.

Structure and Effects of Third Embodiment

As described above, the PC 7a according to the third embodiment functions as an update processing apparatus for updating the existing file group 45a included in the programmable display 4b. The PC 7a includes the transfer processing unit 751, which functions as an obtaining unit for obtaining the update file group 61a, the difference extraction unit 752, which extracts files in the update file group 61a different from files in the existing file group 45a as difference files, the update time estimate unit 753, which estimates the first update time (first time) taken for the difference writing process for writing the difference files to the memory unit 45, and the UI unit 72, which displays the first update time.

This allows the user to check the output update time and thus to easily estimate the time taken for the difference wiring process. This further improves the convenience for the user in updating the existing file group 45a.

In the same manner as in the first embodiment, the update time estimate unit 753 also estimates the second update time (second time) taken for the all-file writing process for writing all the files in the update file group 61a to the memory unit 45, and displays the second update time on the UI unit 72. This allows the user to recognize the time shortened by performing the difference writing process instead of performing the all-file writing process.

The UI unit 72 also functions as an input unit, which receives an instruction for selecting either of the difference writing process or the all-file writing process. When the UI unit 72 receives an instruction for selecting the difference writing process, the transfer processing unit 751 transfers the difference files to the programmable display 4b. When the UI unit 72 receives an instruction for selecting the all-file writing process, the transfer processing unit 751 transfers the update file group 61a to the programmable display 4b. The writing unit 49 then updates the existing file group 45a and the first manifest file 45b included in the memory unit 45. This further improves the convenience for the user in updating the existing file group.

Although the PC 7a includes the package file generating unit 73, the PC 7a may include no package file generating unit 73, and obtain the package file 61 from another information processing apparatus and store the package file 61 in the memory unit 74.

Modifications

Although the update time estimate units 473 and 753 estimate the update times taken for both the all-file writing process and the difference writing process in the above embodiments, the update time estimate units 473 and 753 may estimate only the first update time taken for the difference writing process. In this case, steps S5, S7, S9, and S10 may be eliminated from the flowchart shown in FIG. 4. In the same manner, steps S5, S19, S20, and S10 may be eliminated from the flowchart shown in FIG. 12.

Although the update time estimate units 473 and 753 use the writing speed table 83 shown in FIG. 7 to calculate the update times in the above embodiments, the update time estimate units 473 and 753 may store, instead of the writing speed table 83 shown in FIG. 7, a table that associates the number of files with the estimated writing time. The update time estimate units 473 and 753 may read the estimate update time for the number of files to be written from the table, and may use the read estimated update time as an update time.

The update time window 80 displayed on the display unit 43 or the UI unit 72 may not be limited to the window shown in FIG. 8. Modifications of the update time window will be described below.

First Modification of Update Time Window

Figure 14:
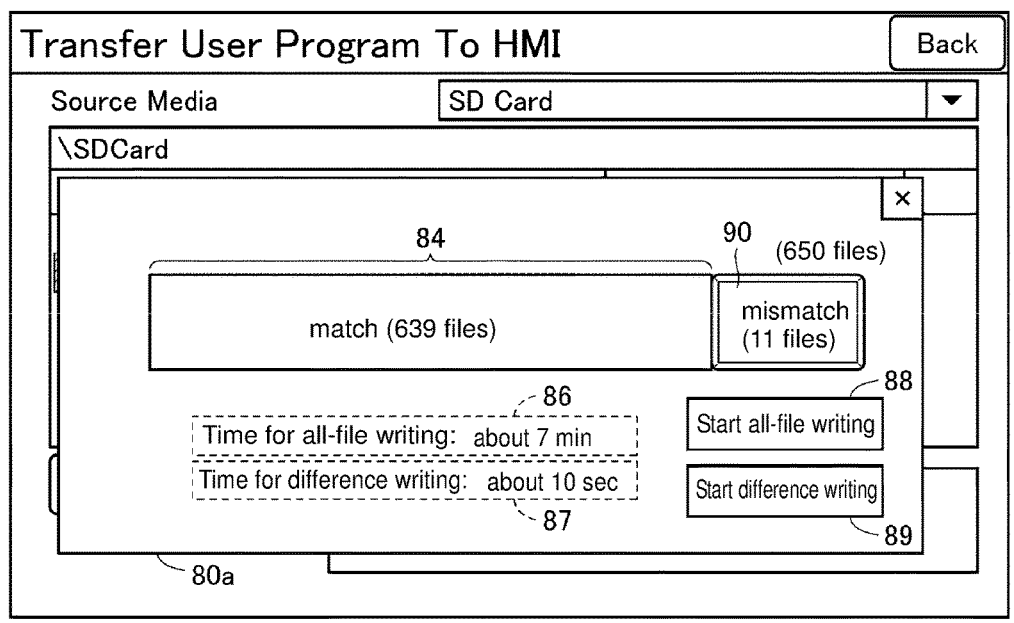
FIG. 14 is a diagram showing a first modification of the update time window.

FIG. 14 is a diagram showing a first modification of the update time window. As shown in FIG. 14, the display unit 43 or the UI unit 72 displays an update time window 80a. The update time window 80a, which displays the time taken for the difference writing process, differs from the update time window 80 shown in FIG. 8 in that it includes a button 90 for instructing to start the difference writing process instead of the area 85.

When the button 90 is pressed, the writing unit 474 or the transfer processing unit 751 starts the difference writing process.

Second Modification of Update Time Window

Figure 15:
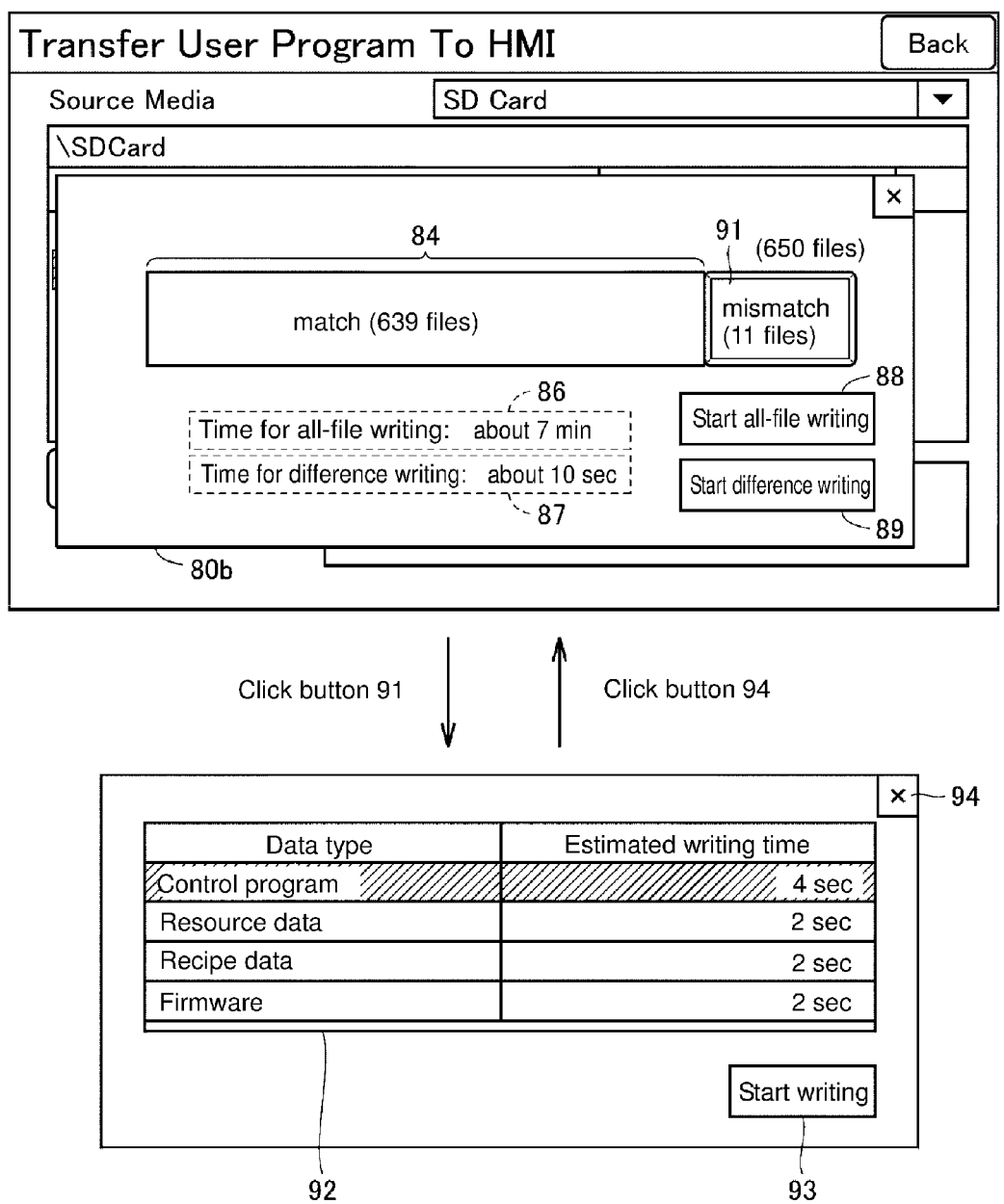
FIG. 15 is a diagram showing a second modification of the update time window.

FIG. 15 is a diagram showing a second modification of the update time window. As shown in the upper part of FIG. 15, the display unit 43 or the UI unit 72 displays an update time window 80b. The update time window 80b, which displays the time taken for the difference writing process, differs from the update time window 80 shown in FIG. 8 in that it includes a button 91 for revealing the types of difference files instead of the area 85.

In this case, the second manifest file 61b includes type information indicating the file type of each file as one item of file information for each file. The file types are classified by, for example, the purpose of files, into files for control programs, files for firmware, recipe data to be written to the PLCs 1 to 3, resource data such as image data, or other data.

The update time estimate units 473 and 753 classify each difference file based on the type information. The update time estimate units 473 and 753 then calculate the update time taken for writing a file of each file type to the memory unit 45. The update time estimate units 473 and 753 use the same method as the method used for calculating the first update time taken for the difference writing process.

When the button 91 is pressed in the update time window 80b in the upper part of FIG. 15, the display unit 43 or the UI unit 72 displays a screen that lists, for each file type, the update times (estimated writing times) taken for writing difference files of each file type to the memory unit 45.

The lower part of FIG. 15 shows a screen listing the update times for each file type in one example. As shown in the figure, the display unit 43 or the UI unit 72 displays a window including a list 92 of update times (estimated writing time in the figure) for each type, a button 93 for instructing to start writing, and a cancel button 94.

When the cancel button 94 is pressed, the display unit 43 or the UI unit 72 changes the screen shown in the upper part of FIG. 15.

When the button 93 is pressed with one type selected in the list 92 (control program is selected in FIG. 15), the writing unit 474 or the transfer processing unit 751 starts the processing for updating the difference files of the selected type. In this processing, the writing units 474 and 49 update the first manifest file 45b to change the file information corresponding to the difference files written to the memory unit 45.

This allows the user to select files currently to be updated in accordance with the situation.

Third Modification of Update Time Window

Figure 16A:
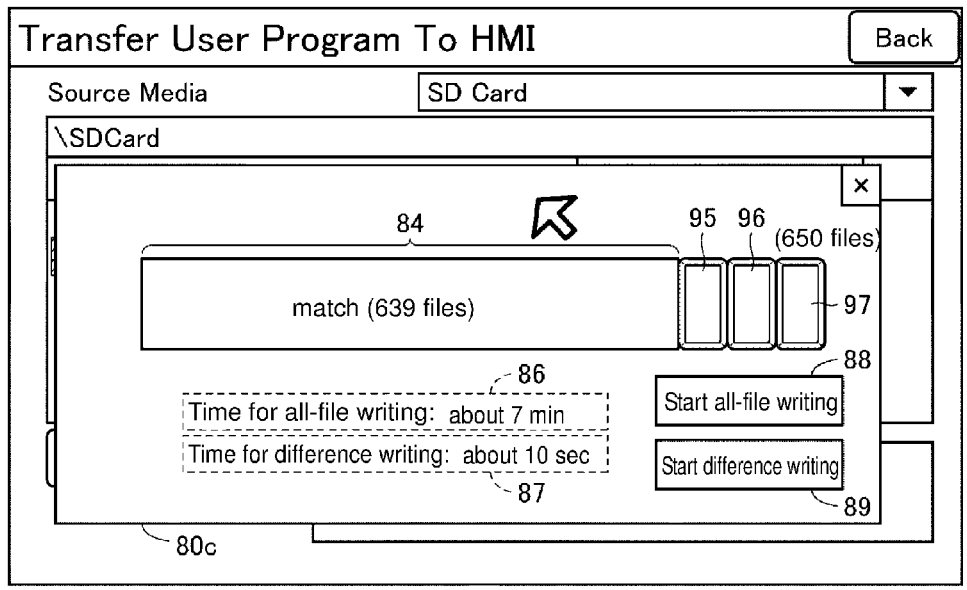
FIGS. 16A and 16B are diagrams showing a third modification of the update time window.
Figure 16B:
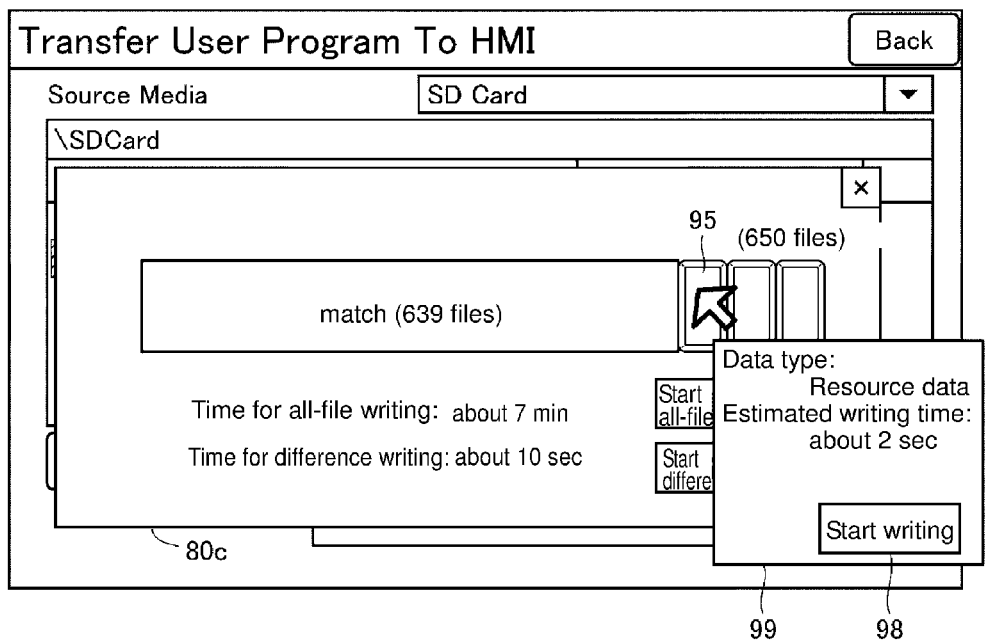
Figure 17:
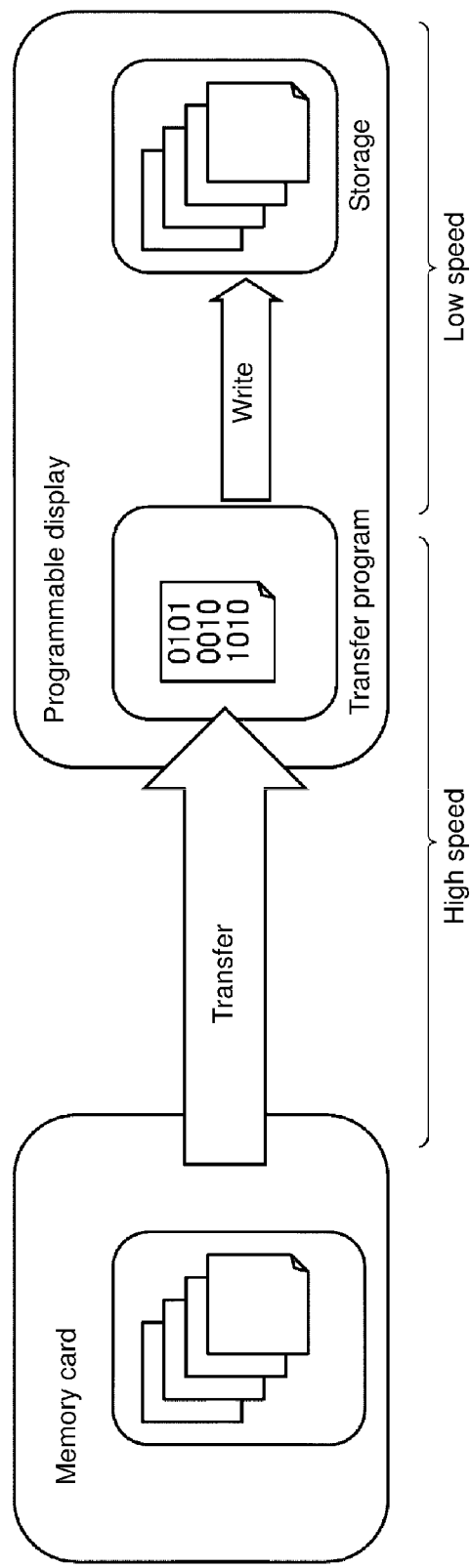
FIG. 17 is a diagram describing transfer of a file when an existing data group stored in the programmable display is updated using a memory card.

FIGS. 16A and 16B are diagrams showing a third modification of the update time window. When the second manifest file 61b includes type information indicating the file type as described above, the display unit 43 or the UI unit 72 displays an update time window 80c shown in FIG. 16A. The update time window 80c differs from the update time window 80b shown in FIG. 15 in that it includes buttons 95 to 97 for prompting display of the estimated writing time for each file type, instead of the button 91.

As shown in FIG. 16B, when a cursor is placed on one of the buttons 95 to 97, the display unit 43 or the UI unit 72 displays a pop-up window 99 that displays the update time taken for writing, to the memory unit 45, difference files of the type corresponding to the button on which the cursor is placed. The pop-up window 99 includes a button 98 for instructing to start writing of the difference files of the corresponding type to the memory unit 45 (writing).

When the button 98 is pressed, the writing unit 474 or the transfer processing unit 751 starts the processing for updating only the difference files of the selected type. In this processing, the writing units 474 and 49 update the first manifest file 45b to change the file information corresponding to the files written to the memory unit 45.

This allows the user to select files currently to be updated in accordance with the situation.

The embodiments disclosed herein are only illustrative in all respects and should not be construed to be restrictive. The scope of the present invention is determined not by the description given above but by the claims, and is construed as including any modification that comes within the meaning and range of equivalency of the claims.

REFERENCE SIGNS LIST 4,4a,4b programmable display
6 memory medium
40 display control unit
42 input unit
43 display unit
44 main control unit
45, 74 memory unit
45a existing file group
45b first manifest file
46 memory medium connecting unit
47, 47a, 75 update processing unit
49, 474 writing unit
61 package file
61a update file group
61b second manifest file
80, 80a, 80b, 80c update time window
471 reading unit
472, 752 difference extraction unit
473, 753 update time estimate unit
751 transfer processing unit

The invention claimed is:

1. A programmable display, comprising a processor configured with a program to perform operations comprising:
operation as a memory unit configured to store a first file group;
operation as an obtaining unit configured to obtain a second file group;
operation as an extraction unit configured to extract, from the second file group, at least one file different from any files included in the first file group as at least one difference file;
operation as a writing unit configured to update the first file group by writing the at least one difference file to the memory unit;
operation as an estimate unit configured to: estimate a first time taken for writing the at least one difference file to the memory unit based on a file size and a file count of the at least one difference file; and estimate a second time taken for writing the second file group to the memory unit based on a file size and a file count of files included in the second file group;
operation as a display control unit configured to display the first time estimated by the estimate unit and the second time estimated by the estimate unit on a display; and
operation as an input unit configured to receive an instruction for selecting a difference writing process for writing the at least one difference file to the memory unit or an all-file writing process for writing the second file group to the memory unit, wherein
the processor is configured with the program such that operation as the writing unit comprises operation as the writing unit that updates the first file group by writing the at least one difference file to the memory unit in response to the input unit receiving the instruction for selecting the difference writing process or by writing the second file group to the memory unit in response to the input unit receiving the instruction for selecting the all-file writing process.

2. The programmable display according to claim 1, wherein
the at least one difference file comprises a plurality of difference files, and
the processor is configured with the program such that operation as the writing unit comprises operation as the writing unit that, in response to the input unit receiving the instruction specifying the file type, writes, to the memory unit, a file having the file type specified by the instruction from the plurality of difference files.

3. The programmable display according to claim 1, wherein the processor is further configured with the program to perform operations comprising:
operation as a connecting unit configured to connect to a memory medium storing the second file group,
wherein the processor is configured with the program such that operation as the obtaining unit comprises operation as the obtaining unit that obtains the second file group from the memory medium connected to the connecting unit.

4. The programmable display according to claim 1, wherein the processor is configured with the program such that:
operation as the memory unit comprises operation as the memory unit that is configured to store first information listing information about each file included in the first file group;
operation as the obtaining unit comprises operation as the obtaining unit that obtains second information listing information about each file included in the second file group, and
operation as the extraction unit comprises operation as the extraction unit that extracts the at least one difference file based on a comparison between the first information and the second information.

5. An update processing apparatus for updating a first file group in a programmable display comprising a memory unit for storing the first file group, the apparatus comprising a processor configured with a program to perform operations comprising:
operation as an obtaining unit configured to obtain a second file group;

operation as an extraction unit configured to extract, from the second file group, at least one file different from any files included in the first file group as at least one difference file;

operation as a writing unit configured to update the first file group by writing the at least one difference file to the memory unit;

operation as an estimate unit configured to: estimate a first time taken for writing the at least one difference file to the memory unit based on a file size and a file count of the at least one difference file; and estimate a second time taken for writing the second file group to the memory unit based on a file size and a file count of files included in the second file group;

operation as an output unit configured to output the first time estimated by the estimate unit and the second time estimated by the estimate unit; and operation as an input unit configured to receive an instruction for selecting a difference writing process for writing the at least one difference file to the memory unit or an all-file writing process for writing the second file group to the memory unit, wherein the processor is configured with the program such that operation as the writing unit comprises operation as the writing unit that updates the first file group by writing the at least one difference file to the memory unit in response to the input unit receiving the instruction for selecting the difference writing process or by writing the second file group to the memory unit in response to the input unit receiving the instruction for selecting the all-file writing process.

6. A data updating method for updating a first file group in a programmable display comprising a memory unit for storing the first file group, the method comprising:

obtaining a second file group;

extracting, from the second file group, at least one file different from any files included in the first file group as at least one difference file;

updating the first file group by writing the at least one difference file to the memory unit;

estimating a first time taken for writing the at least one difference file to the memory unit based on a file size and a file count of the at least one difference file;

estimating a second time taken for writing the second file group to the memory unit based on a file size and a file count of files included in the second file group;

displaying the first time and the second time on a display; and receiving an instruction for selecting a difference writing process for writing the at least one difference file to the memory unit or an all-file writing process for writing the second file group to the memory unit, wherein updating the first file group by writing the at least one difference file to the memory unit comprises writing the at least one difference file to the memory unit in response to receiving the instruction for selecting the difference writing process; or writing the second file group to the memory unit in response to receiving the instruction for selecting the all-file writing process.

7. An information processing method for updating a first file group in a programmable display comprising a memory unit for storing the first file group, the method comprising:

obtaining a second file group;

extracting, from the second file group, at least one file different from any files included in the first file group as at least one difference file;

updating the first file group by writing the at least one difference file to the memory unit;

estimating a first time taken for writing the at least one difference file to the memory unit based on a file size and a file count of the at least one difference file;

estimating a second time taken for writing the second file group to the memory unit based on a file size and a file count of files included in the second file group;

outputting the first time and the second time; and receiving an instruction for selecting the difference writing process for writing the at least one difference file to the memory unit or an all-file writing process for writing the second file group to the memory unit, wherein updating the first file group by writing the at least one difference file to the memory unit comprises one of: writing the at least one difference file to the memory unit in response to receiving the instruction for selecting the difference writing process; or writing the second file group to the memory unit in response to receiving the instruction for selecting the all-file writing process.

8. A non-transitory computer-readable recording medium storing a program for controlling a programmable display comprising a memory unit for storing a first file group, the program causing a processor of the programmable display to perform operations comprising:

obtaining a second file group;

extracting, from the second file group, at least one file different from any files included in the first file group as at least one difference file;

updating the first file group by writing the at least one difference file to the memory unit;

estimating a first time taken for writing the at least one difference file to the memory unit based on a file size and a file count of the at least one difference file;

estimating a second time taken for writing the second file group to the memory unit based on a file size and a file count of files included in the second file group;

displaying the first time and the second time on a display; and receiving an instruction for selecting a difference writing process for writing the at least one difference file to the memory unit or an all-file writing process for writing the second file group to the memory unit, wherein updating the first file group by writing the at least one difference file to the memory unit comprises one of: writing the at least one difference file to the memory unit in response to receiving the instruction for selecting the difference writing process; or writing the second file group to the memory unit in response to receiving the instruction for selecting the all-file writing process.

9. A non-transitory computer-readable recording medium storing a program for controlling an update processing apparatus that updates a first file group in a programmable display comprising a memory unit for storing the first file group, the program causing a processor of the update processing apparatus to perform operations comprising:

obtaining a second file group;

extracting, from the second file group, at least one file different from any files included in the first file group as at least one difference file;

updating the first file group by writing the at least one difference file to the memory unit;
estimating a first time taken for writing the at least one difference file to the memory unit based on a file size and a file count of the at least one difference file;
estimating a second time taken for writing the second file group to the memory unit based on a file size and a file count of files included in the second file group;
outputting the first time and the second time; and
receiving an instruction for selecting a difference writing process for writing the at least one difference file to the memory unit or an all-file writing process for writing the second file group to the memory unit, wherein
updating the first file group by writing the at least one difference file to the memory unit comprises one of: writing the at least one difference file to the memory unit in response to receiving the instruction for selecting the difference writing process; or writing the second file group to the memory unit in response to receiving the instruction for selecting the all-file writing process.

* * * * *